Patented Jan. 25, 1938

2,106,452

UNITED STATES PATENT OFFICE 2,106,452

REACTION PRODUCT AND PROCESS

Herman A. Bruson and Lloyd W. Covert, Philadelphia, Pa., assignors to Röhm & Haas Company, Philadelphia, Pa.

No Drawing. Original application October 27, 1934, Serial No. 750,278, now Patent No. 2,068,634. Divided and this application March 14, 1936, Serial No. 68,884

8 Claims. (Cl. 260—2)

This invention relates to new synthetic resins and deals more specifically with resins obtained from perhydro derivatives of polynuclear polyhydric phenols, said perhydro derivatives having the general formula—

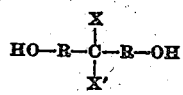

wherein R is a nuclearly hydrogenated aromatic hydrocarbon nucleus, and X and X' each represent a hydrogen atom, alkyl or hydroaromatic hydrocarbon radical, or jointly a polymethylene ring.

According to the present invention, the perhydro derivatives of β,β-bis-(p-hydroxyphenyl)-propane, bis-(p-hydroxyphenyl)-methane, α,α-bis-(p-hydroxyphenyl)-ethane, 1,1-bis-(p-hydroxyphenyl)-cyclohexane, bis-(β-hydroxynaphtho)-methane, β,β-bis(4-hydroxy-3-methylphenyl)-propane, and of similarly constituted compounds, when heated to temperatures above their melting point but below their critical cracking temperature, preferably in vacuo; and preferably in the absence of inorganic dehydrating or dehydrogenating catalysts or of phenolic impurities, gradually lose their crystalline characteristics and go over into hard, transparent, glass-like resins having an extremely light color, (generally water white). These new resins are very resistant to alkalies, water, and dilute inorganic acids. They are in general soluble in alcohols such as butanol, but insoluble in hydrocarbons. In physical properties these new resins resemble natural dammar resin, giving low viscosity solutions which deposit fast-drying, low solvent retention films of good adhesion, gloss, and hardness. They can be used as resin ingredients in coating compositions, particularly in cellulose ester or cellulose ether lacquers and in molding powders. They give clear, transparent films alone or when used as resin components in nitrocellulose or cellulose acetate lacquers, and can be used as an intermediate layer when plasticized, in the manufacture of so-called "safety glass" or non-shatterable glass. They may be admixed with natural or synthetic resins such as rosin, copals, ester gums, phenolic-formaldehyde and urea-formaldehyde resins.

Another embodiment of the present invention consists in heating the perhydro derivatives having the above general formula, with organic polycarboxylic or monocarboxylic acids or their anhydrides or mixtures thereof, whereby hard, brittle resins or semi-solid balsam-like amorphous bodies are formed, which, depending upon the nature of the acids used, may be employed either in the manufacture of oleoresinous varnishes or as plasticizers for organic plastic materials.

The perhydro derivatives herein mentioned as the initial starting materials for resin manufacture are obtained by hydrogenating polyhydric phenols of the formula—

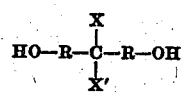

wherein R is an aromatic hydrocarbon nucleus and X and X' represent hydrogen, alkyl, aryl, or jointly a polymethylene ring; in the presence of an inert solvent such as ethyl alcohol and an active hydrogenation catalyst such as finely divided nickel at about 200° C. and about 150 atmospheres pressure until the aromatic groups R are both completely hydrogenated. The perhydro derivatives used are entirely free from partially hydrogenated or unhydrogenated phenolic materials. This is ascertained by removing a sample and testing for solubility in 10% potassium hydroxide solution which dissolves such impurities but does not dissolve the perhydro compound. The temperature of the hydrogenation should not be high enough to crack the starting materials or the finished product; a temperature range of 190-220° C. being in general desirable. The catalyst is then filtered off and the solvent is removed by distillation from the phenol-free reaction product. The residue is the perhydro derivative. It usually forms a colorless crystal mass.

This invention may be illustrated by the following examples, but they are not to be considered as limiting the invention to the exact materials and conditions shown, since the invention may be otherwise practiced within the scope of the appended claims:

Example 1.—In practicing one embodiment of this invention, perhydro-β,β-[bis-(p-hydroxyphenyl)-propane] such as may be obtained by hydrogenating the two benzene rings in β,β-[bis-(p-hydroxyphenyl)-propane]

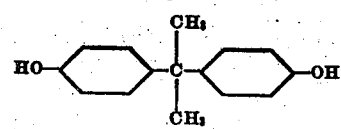

at 200° C. for 4 hours in its own weight of ethyl alcohol in the presence of an active nickel catalyst until 12 atoms of hydrogen have been taken up, was heated at 250–300° C. for 3–4 hours while maintaining 2 mm. pressure. About 20 grams of a colorless balsam-like material distilled off. The residue on cooling formed a colorless, transparent resin having a melting point of about 160° C. It may be distilled in vacuo with slight decomposition, and boils at about 200° C/2 mm. The vacuum distilled product melted at 130–150° C. and formed a colorless, hard, brittle, glassy solid. It was soluble in ethyl or butyl alcohol.

In a similar manner, the perhydro derivatives of bis-(p-hydroxyphenyl)-methane

and of α,α-bis-(p-hydroxyphenyl)-ethane

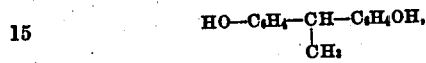

yield colorless resins having similar properties when heated to temperatures of from 250–350° C. The higher molecular homologues such as the perhydro derivative of 1,1-bis-(p-hydroxyphenyl)-cyclohexane

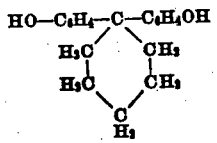

likewise yield similar resins.

In practicing another embodiment of the present invention, the above mentioned perhydro derivatives either in the crystalline form or in the amorphous resinous condition as obtained by the heat treatment described above, are condensed with organic monocarboxylic or polycarboxylic acids or with mixtures of mono- and polycarboxylic acids, or anhydrides thereof. The condensation may be carried out by heating either in an inert organic solvent under reflux under conditions whereby the water is continuously removed as fast as formed, or else in kettles fitted with a short air condenser and preferably under constant agitation.

Among the acids which have been found suitable for condensation with the above mentioned perhydro bodies are the fatty acids, particularly propionic, crotonic, lactic, glycollic and α-hydroxyisobutyric. Other acids such as oleic, linoleic, stearic, eleostearic, ricinoleic or naphthenic can also be used. These latter condensation products are oily or soft somewhat viscous balsam-like masses which are soluble in ethyl acetate and can be used as plasticizers in coating compositions such as cellulose esters or cellulose ethers. By using rosin or polycarboxylic acids or anhydrides such as phthalic, succinic, maleic or adipic, hard resins are obtained upon heating to 190° C.–250° C., with the above mentioned perhydro derivatives. Esterification catalysts such as mineral acids, oxides, or salts can be present during the condensation such as sulphuric, boric, or phosphoric acids, zinc or calcium oxides, or zinc chloride. Fatty glycerides such as linseed oil, cotton seed oil, tung oil, castor oil, palm oil, soya bean oil and the like may be added during the condensation in order to modify the physical properties of the resins formed.

Example 2.—A mixture of 50 grams perhydro-β,β-[bis-(p-hydroxyphenyl)-propane] of melting point 192–193° C., and 60 grams propionic anhydride was heated at 100° C. for 5–6 hours and then boiled one hour longer under reflux. The propionic acid was distilled off and the oily residue distilled in vacuo. It formed a very viscous colorless oil boiling at 200–205° C./1.5 mm. This product was found to be an excellent plasticizer for nitrocellulose, and cellulose acetate.

Example 3.—A mixture of 50 grams perhydro-β,β-[bis-(p-hydroxyphenyl)-propane], 50 grams 85% lactic acid and 200 ccm. xylene was refluxed, while using an automatic water separator to continuously remove the water as fast as formed and to return the xylene to the reaction vessel. When no more water came over (3–4 hours) the xylene solution of the reaction product obtained was cooled, washed thoroughly with water to remove any free acidity, and the xylene distilled off. The residue was a pale yellow semi-solid, sticky, balsam-like material which is useful as a plasticizer for phenol-formaldehyde resins.

Example 4.—A mixture of 200 grams perhydro-β,β-[bis-(p-hydroxyphenyl)-propane] and 40 grams maleic anhydride was heated in an open vessel with stirring at 195–200° C. for 5 hours. The product obtained was a very pale amber-colored, hard, brittle resin having a melting point 85–90° C. and acid number 7–8. It was readily soluble in toluene. A varnish was prepared from the resin by heating with its own weight of China-wood oil to 600° F. The clear varnish obtained was diluted with its own volume of petroleum naphtha, driers added in the usual manner and a pale, fast-drying varnish obtained. By increasing the amount of maleic anhydride to 60 grams and heating as above for 6½ hours, a resin having a melting point 111–130° C. was obtained.

Example 5.—A mixture of 20 grams sebacic acid and 23.8 grams perhydro-β,β-[bis-(p-hydroxyphenyl)-propane] was heated in an open flask at 190–195° C. for 5 hours. A very tough, somewhat hard, amber-colored resin was obtained. It was readily soluble in toluene, acetone, or butyl acetate and can be used in nitrocellulose lacquers as a gum.

Example 6.—By using 14.8 grams phthalic anhydride in place of the sebacic acid in Example 5, and heating at 200° C. for 7 hours, a colorless, hard, brittle resin was obtained, which was readily soluble in butyl acetate, toluene, or warm tung oil.

It is already known that resins are obtained by heating polyhydric alcohols with polybasic acids such as phthalic, maleic, succinic, sebacic and the like. When dihydric alcohols are used in such prior process, low melting oily or waxy materials are invariably produced. According to the present invention, however, condensation products of perhydro derivatives of the type set forth herein with polybasic acids yields hard, brittle, high melting resins which possess the unique property of being readily soluble in hot drying or semi-drying oils in contrast to the usual alkyd type resins which must first be heated with long-chain fatty acids or rosin in order to become oil-soluble.

This application is a division of our copending application Serial No. 750,278 filed October 27, 1934 Patent No. 2,068,634.

We claim:

1. In a process for preparing a resin the step which consists of heating a material which consists of perhydro derivatives of compounds of the formula

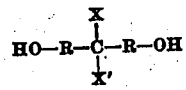

wherein R is an aromatic hydrocarbon nucleus, X and X′ represent hydrogen, alkyl, aryl, or jointly a polymethylene ring, to a temperature above their melting points, but below their critical cracking temperatures, until their crystalline character disappears.

2. In a process for preparing a resin or balsam-like material the step which consists of heating a material which consists of a perhydro derivative of a diarylol methane compound to a temperature above its melting point but below its critical cracking temperature, until its crystalline character disappears.

3. In a process for preparing a resin or balsam-like material the step which consists of heating a material which consists of a perhydro derivative of a diphenylol methane compound to a temperature above its melting point but below its critical cracking temperature, until its crystalline character disappears.

4. In a process for preparing a resin the step which consists of heating a material which consists of perhydro-β,β-[bis-(p-hydroxyphenyl)-propane], until its crystalline character disappears.

5. A resin consisting of a material which consists of perhydro derivatives of compounds of the formula

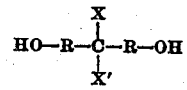

wherein R is an aromatic hydrocarbon nucleus, X and X' represent hydrogen, alkyl, aryl, or jointly a polymethylene ring, which have been heated until their crystalline character is lost.

6. A resin consisting of the product obtained by heating a material which consists of a perhydro derivative of a diarylol methane compound until its crystalline character disappears.

7. A resin consisting of the product obtained by heating a material which consists of a perhydro diphenylol methane compound until its crystalline character disappears.

8. A resin consisting of the product obtained by heating a material which consists of perhydro-β,β-[bis-(p-hydroxyphenyl)-propane] until its crystalline character disappears.

HERMAN A. BRUSON.
LLOYD W. COVERT.